(12) United States Patent
Agmon et al.

(10) Patent No.: US 7,463,580 B2
(45) Date of Patent: Dec. 9, 2008

(54) RESOURCE SHARING AMONG NETWORK TUNNELS

(75) Inventors: Gideon Agmon, Kfar-Sava (IL); Moran Roth, Tel-Aviv (IL)

(73) Assignee: Corrigent Systems, Ltd., Tel-Aviv (IL)

( * ) Notice: Subject to any disclaimer, the term of this patent is extended or adjusted under 35 U.S.C. 154(b) by 397 days.

(21) Appl. No.: 11/305,486

(22) Filed: Dec. 15, 2005

(65) Prior Publication Data

US 2007/0140233 A1    Jun. 21, 2007

(51) Int. Cl.
*H04L 12/26* (2006.01)

(52) U.S. Cl. .................. 370/218; 370/222; 709/239; 714/4

(58) Field of Classification Search ............ 370/248, 370/395.5, 218, 216, 225, 227; 709/239; 379/22.01; 714/4
See application file for complete search history.

(56) References Cited

U.S. PATENT DOCUMENTS

| | | | |
|---|---|---|---|
| 6,507,577 B1 | 1/2003 | Mauger et al. | |
| 6,522,627 B1 | 2/2003 | Mauger | |
| 6,778,494 B1 | 8/2004 | Mauger | |
| 6,795,394 B1 | 9/2004 | Swinkels | |
| 6,895,441 B1* | 5/2005 | Shabtay et al. | 709/238 |
| 7,079,544 B2 | 7/2006 | Wakayama et al. | |
| 7,092,356 B2 | 8/2006 | Rabie et al. | |
| 7,197,008 B1* | 3/2007 | Shabtay et al. | 370/218 |
| 7,248,561 B2 | 7/2007 | Ishibashi et al. | |
| 7,260,097 B2 | 8/2007 | Casey | |
| 2001/0032271 A1* | 10/2001 | Allen | 709/239 |
| 2002/0085548 A1 | 7/2002 | Ku et al. | |
| 2003/0076829 A1 | 4/2003 | Rabie | |
| 2003/0147352 A1* | 8/2003 | Ishibashi et al. | 370/248 |
| 2003/0185217 A1* | 10/2003 | Ganti et al. | 370/395.5 |
| 2003/0233595 A1* | 12/2003 | Charny et al. | 714/4 |
| 2004/0008687 A1 | 1/2004 | Matsubara | |
| 2004/0017816 A1 | 1/2004 | Ishwar et al. | |
| 2004/0109408 A1* | 6/2004 | Mesh et al. | 370/222 |
| 2004/0196787 A1 | 10/2004 | Wang et al. | |
| 2004/0202157 A1 | 10/2004 | Chase et al. | |
| 2005/0111351 A1* | 5/2005 | Shen | 370/217 |
| 2005/0125490 A1 | 6/2005 | Ramia | |

(Continued)

OTHER PUBLICATIONS

Changcheng Huang; Sharma, V.; Owens, K.; Makam, S., "Building reliable MPLS networks using a path protection mechanism," Communications Magazine, IEEE, vol. 40, No. 3, pp. 156-162, Mar. 2002.*

(Continued)

*Primary Examiner*—Hassan Kizou
*Assistant Examiner*—Jeffrey M Rutkowski
(74) *Attorney, Agent, or Firm*—Townsend and Townsend and Crew LLP

(57) ABSTRACT

A method for communication includes defining a resource-sharing group including two or more communication paths that traverse at least two different routes through a communication network, the routes traversing at least one common network element. A notification of an affiliation of the two or more communication paths with the resource-sharing group is distributed over the network. A resource associated with the at least one common network element is allocated so as to share an allocation of the resource among the communication paths in the resource-sharing group responsively to the notification.

22 Claims, 2 Drawing Sheets

U.S. PATENT DOCUMENTS

2005/0249121 A1  11/2005  Matsunaga
2006/0268682 A1* 11/2006  Vasseur ...................... 370/216
2007/0038767 A1   2/2007  Miles et al.

OTHER PUBLICATIONS

U.S. Appl. No. 09/935,970, Office Action dated Aug. 10, 2006, 7 pages.
Office Action, U.S. Appl. No. 10/369,953, 25 pages, Sep. 11, 2007.
U.S. Appl. No. 09/935,970, Office Action dated Jan. 26, 2007, 11 pages.
Rosen et al., in Request for Comments (RFC) 3031 of the Internet Engineering Task Force (IETF), entitled *Multiple Label Switching Architecture* (Jan. 2001).
Andersson et al., in the IETF RFC 3036 entitled *Label Distribution Protocol Specification* (Jan. 2001).
Jamoussi et al., in IETF RFC 3212 entitled *Constraint-Based LDP Setup Using LDP* (Jan. 2002).
Awduche et al., in IETF RFC 3209 entitled *RSVP-TE: Extensions to RSVP for LSP Tunnels*, (Dec. 2001).
Braden et al., in IETF RFC 2205 entitled *Resource ReSerVation Protocol. (RSVP)—Version 1 Functional Specification* (Sep. 1997).
Braden et al., in IETF RFC 1633 entitled *Integrated Services in the Internet Architecture*: an Overview (Jun. 1994).

* cited by examiner

RESOURCE SHARING AMONG NETWORK TUNNELS

FIELD OF THE INVENTION

The present invention relates generally to communication network, and particularly to methods and systems for sharing resources of network elements in tunneled networks.

BACKGROUND OF THE INVENTION

Multiprotocol Label Switching (MPLS) has gained popularity as a method for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. MPLS is also described by Andersson et al., in IETF RFC 3036 entitled "Label Distribution Protocol Specification" (January, 2001), which is incorporated herein by reference.

In MPLS, each packet is assigned to a Forwarding Equivalence Class (FEC) when it enters the network, depending on its destination address. The packet receives a label, referred to as an "MPLS label" identifying the FEC to which it belongs. All packets in a given FEC are passed through the network over the same path by label-switching routers (LSRs). The flow of packets along a label-switched path (LSP) under MPLS is completely specified by the label applied at the ingress node of the path. Therefore, an LSP can be viewed as a tunnel through the network, and is commonly referred to as an "MPLS tunnel."

MPLS defines a label distribution protocol (LDP) by which one LSR informs another of the meaning of labels used to forward traffic between and through them. An extension of LDP for setting up constraint-based label switched paths (CR-LSPs) is referred to as CR-LDP and is defined by Jamoussi et al., in IETF RFC 3212 entitled "Constraint-Based LSP Setup using LDP" (January, 2002), which is incorporated herein by reference. CR-LDP provides support for constraint-based routing of traffic across the routed network. LSPs can be set-up based on explicit route constraints, quality of service (QoS) constraints and other constraints.

Another protocol used for setting up MPLS tunnels is RSVP-TE, which is described by Awduche et al., in IETF RFC 3209 entitled "RSVP-TE: Extensions to RSVP for LSP Tunnels" (December, 2001), which is incorporated herein by reference. RSVP-TE extends the well-known Resource Reservation Protocol (RSVP), allowing the establishment of explicitly-routed LSPs using RSVP as a signaling protocol. RSVP itself is described by Braden et al., in IETF RFC 2205 entitled "Resource ReSerVation Protocol (RSVP)—Version 1 Functional Specification" (September, 1997), which is incorporated herein by reference.

The RSVP-TE protocol defines a shared explicit (SE) reservation style that enables some bandwidth sharing. The SE style allows a receiver to explicitly specify the senders to be included in a reservation message. A single reservation is made on a link for all the senders listed.

In some applications, network elements allocate resources such as bandwidth to the services they provide. For example, the IETF has proposed the Integrated Services (IntServ) protocol architecture as a framework for allocating different levels of QoS to different services. IntServ is described by Braden et al., in IETF RFC 1633 entitled "Integrated Services in the Internet Architecture: an Overview" (June, 1994), which is incorporated herein by reference.

SUMMARY OF THE INVENTION

In many networking applications, two or more communication paths that traverse a communication network may share common network resources, such as resources of a network element or network segment. For example, two communication paths may be set up to protect one another against network failures. If a certain network element is common to both paths, its resources may be shared between the paths. In other cases, the two communication paths may traverse a common network segment (i.e., a communication link or other shared communication medium connecting two network elements), whose resources may be shared between the paths. In comparison with independent resource allocation, resource sharing generally makes more efficient use of the capacity of the network segments and network elements, enabling them to support a higher number of services and to offer improved QoS.

However, tunnel-oriented resource reservation protocols such as RSVP-TE and CR-LDP cited above are typically unable to share resources among communication paths, such as protected paths (except for resource sharing between different instances of the same path, which are not considered to be separate communication paths in this context). The methods and systems described hereinbelow enable resource allocations in network segments and network elements to be shared between two or more communication paths, thus overcoming these shortcomings of the prior art.

In some embodiments, an operator defines communication paths that traverse a communication network, each path traversing network segments and using resources of network elements in the network. The operator defines a resource-sharing group comprising two or more of the communication paths, which can share allocations of resources in common network segments and/or elements, if such segments or elements exist. An announcement of the affiliation of the two or more communication paths with the resource-sharing group is distributed to the network elements. Having received the distributed affiliation announcement, network elements common to at least some of the communication paths of the resource-sharing group are able to allocate shared resources to these communication paths. Shared resources may comprise, for example, bandwidth allocation in common segments, network element port utilization and memory space, as well as combinations of these resources. Specifically, when using a ring topology, the shared resources may comprise the resources of shared media, such as ring segments over which several nodes add their traffic.

In some embodiments, the communication paths comprise MPLS tunnels, and the announcement of the affiliation of MPLS tunnels with a certain resource-sharing group is distributed to the network elements using a reservation protocol such as RSVP-TE or CR-LDP.

There is therefore provided, in accordance with an embodiment of the present invention, a method for communication, including:

defining a resource-sharing group including two or more communication paths that traverse at least two different routes through a communication network, the routes traversing at least one common network element;

distributing a notification over the network of an affiliation of the two or more communication paths with the resource-sharing group; and allocating a resource associated with the at least one common network element so as to share an allocation of the resource among the communication paths in the resource-sharing group responsively to the notification.

In an embodiment, the resource-sharing group includes two or more tunnels through the network. Additionally or alternatively, distributing the notification includes sending at least one of resource reservation protocol traffic engineering (RSVP-TE) messages and constraint-based label distribution protocol (CR-LDP) messages with respect to the tunnels.

In another embodiment, defining the resource-sharing group includes defining a sharing group index (SGI) value associated with the resource-sharing group, distributing the notification includes sending reservation messages including the SGI value so as to set up the communication paths affiliated with the resource-sharing group, and allocating the resource includes receiving the reservation messages at the common network element and sharing the allocation of the resource responsively to the SGI values in the received reservation messages.

In yet another embodiment, one of the paths affiliated with the resource-sharing group includes an alternative communication path traversing a first route, which is set up to protect a primary communication path affiliated with the resource-sharing group traversing a second route, different from the first route, against a failure in at least one of a network element and a network segment along the second route.

In still another embodiment, the resource includes a bandwidth on a common network segment connected to the at least one common network element and traversed by the routes.

In an embodiment, the common network segment includes a common ring segment belonging to a ring topology, and allocating the resource includes allocating the resource of the common ring segment by applying a ring-level call admission control (CAC) function.

In another embodiment, allocating the resource includes allocating at least one of a bandwidth, a memory space, a port and a switching hardware component.

There is additionally provided, in accordance with an embodiment of the present invention, a network element, including:

a network interface for communicating with other elements in a communication network; and a processor, which is arranged to accept, via the network interface, a notification distributed over the communication network of an affiliation with a resource-sharing group of two or more communication paths that traverse at least two different routes through the network, the processor including a call admission control (CAC) module, which is arranged, when the network element is traversed by at least some of the communication paths in the resource-sharing group, to allocate a resource associated with the network element so as to share an allocation of the resource among the at least some of the communication paths responsively to the notification.

There is also provided, in accordance with an embodiment of the present invention, a computer software product used in a network element, the product including a computer-readable medium, in which program instructions are stored, which instructions, when read by a computer, cause the computer to accept a notification, distributed over a communication network, of an affiliation with a resource-sharing group of two or more communication paths that traverse at least two different routes through the network, and to allocate a resource associated with the network element so as to share, when the network element is traversed by at least some of the communication paths in the resource-sharing group, an allocation of the resource among the at least some of the communication paths responsively to the notification.

There is further provided, in accordance with an embodiment of the present invention, a communication network, including a plurality of interconnected network elements, which are arranged to accept a notification distributed over the communication network of an affiliation with a resource-sharing group of two or more communication paths that traverse at least two different routes through the network, wherein each network element among the plurality is arranged so that when the network element is traversed by at least some of the communication paths in the resource-sharing group, the network element allocates a resource associated with the network element so as to share an allocation of the resource among the at least some of the communication paths responsively to the notification.

The present invention will be more fully understood from the following detailed description of the embodiments thereof, taken together with the drawings in which:

DETAILED DESCRIPTION OF EMBODIMENTS

Figure 1:
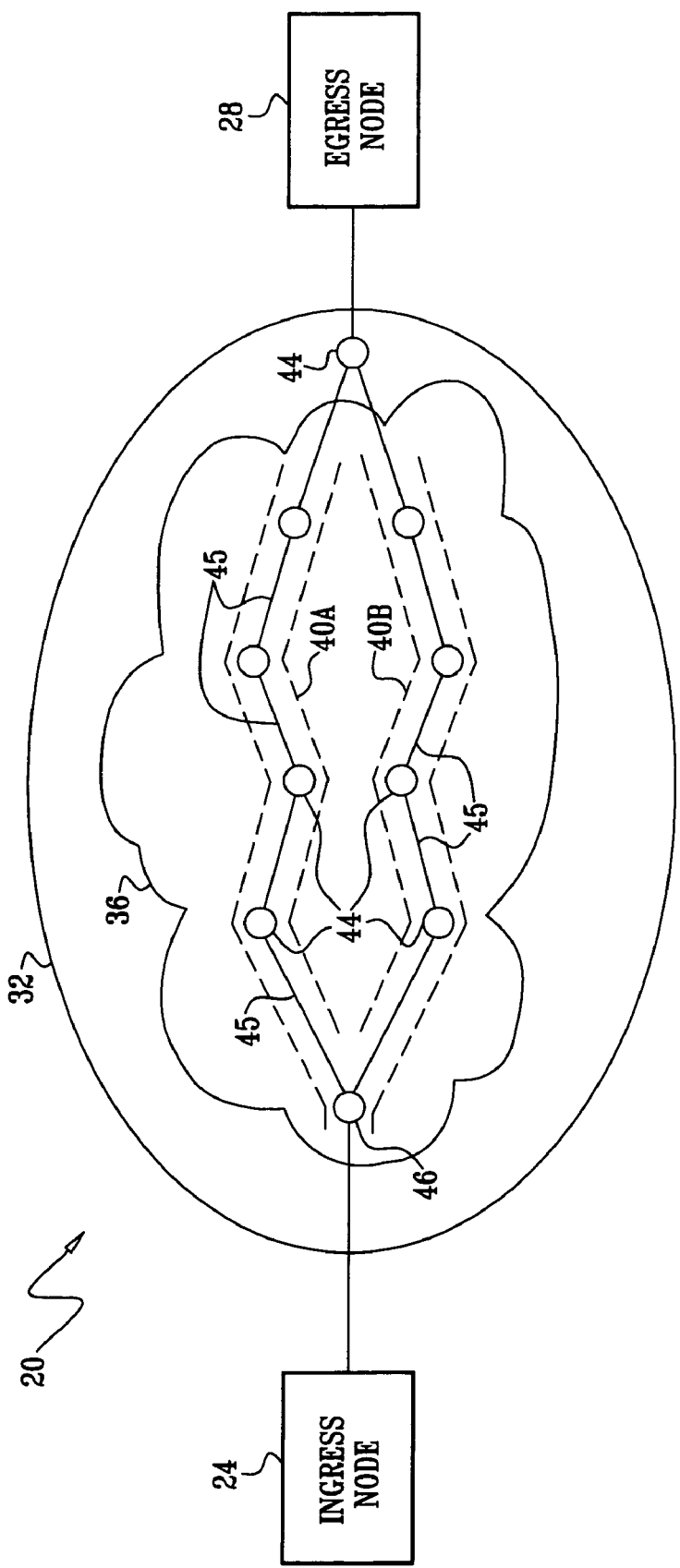
FIG. 1 is a block diagram that schematically illustrates a communication network, in accordance with an embodiment of the present invention.

In many packet network communication applications, it is desirable to protect a communication path between two communicating nodes through the communication network against failure of a network element or a communication link (segment) along the path. Protection is often implemented by predefining or otherwise providing an alternative path through the network. (Throughout this patent application, the nominal path used is referred to as a primary path, and the protecting path is referred to as an alternative path.) If one or more communication links or one or more of the network elements along the primary path fail, packets are sent over the alternative path and communication is maintained.

In layer 3 networks, switching between the primary and alternative path is typically performed using a layer 3 routing protocol such as the Open Shortest Path First (OSPF) or the Intermediate System to Intermediate System (IS-IS) protocols, which are well known in the art.

In many practical scenarios (for example in ring topologies), some network elements, such as routers, switches and add/drop multiplexers (ADM), may be common to (i.e., traversed by) both the primary and the alternative paths. In addition, in a ring topology, some ring segments may be common to both the primary and the alternative paths even though the paths may originate in different nodes connected to the ring.

Common traversal of links and network elements by the primary and alternative paths is particularly common in ring topologies, although it may sometimes occur in other network configurations, as well. For example, the alternative path may follow the same route as the primary path in some parts of the network, and diverge from the primary path at only a certain part of the network that requires particular protection.

Setting up a communication path typically comprises allocating and reserving resources for the path in the segments and network elements along the route of the path, so that the path is able to provide the expected quality of service (QoS). For example, when setting up an MPLS tunnel, each network element along the tunnel is requested to allocate resources to the tunnel using a reservation protocol such as the RSVP-TE or CR-LDP protocols cited above.

In the context of this patent application and in the claims, the term "resource" means any resource associated with a network element. Such resources may comprise any hardware and/or software resource of the network element in question, such as bandwidth allocation, port utilization and memory space. Other resources may comprise resources of a network segment connected to the network element in question, such as bandwidth allocation in this segment. (Typically, bandwidth allocation in a particular network segment is performed at the network elements connected to the segment.) Combinations of two or more of the resources defined above may also be shared. The term "bandwidth allocation" is used to describe any bandwidth allocation scheme, which may comprise, for example, guaranteed bandwidth (also referred to as committed information rate, or CIR), average bandwidth and/or peak bandwidth (also referred to as peak information rate, or PIR) provided only when available without hard guarantee.

When a certain network element is traversed by both the primary and the alternative paths, or when a network segment is common to these paths, it is desirable to share at least some of the resources allocated by the common network element or common segment between the two paths.

Since the alternative path is only used when the primary path fails, resources are actually used by only one of these paths at any given time. Disregarding the relationship between the two paths may lead to a redundant, unnecessary reservation of resources on the common network element. This redundant resource reservation limits the capacity and/or the QoS that can be provided by the common network element.

Existing protocols, such as the RSVP-TE SE style cited above, provide some support for bandwidth sharing between alternative instances of the same MPLS tunnel, but do not enable resource sharing between separate tunnels. Known layer 3 networks do not support resource sharing between communication paths either.

The methods and systems described herein enable network elements to allocate shared resources to two or more communication paths, so as to overcome the shortcomings of the prior art. Although the description that follows mainly addresses sharing bandwidth between two MPLS tunnels that protect one another, the methods and systems described below can be used to share any type of resource, or combination of resources, among a resource-sharing group comprising any number of communication paths. These paths may be affiliated with the resource-sharing group for protection purposes or for any other purpose. In addition to MPLS, the disclosed methods and systems can also be used in other protocols (assuming a suitable resource reservation and signaling protocols are used), such as in asynchronous transfer mode (ATM) networks.

Figure 2:
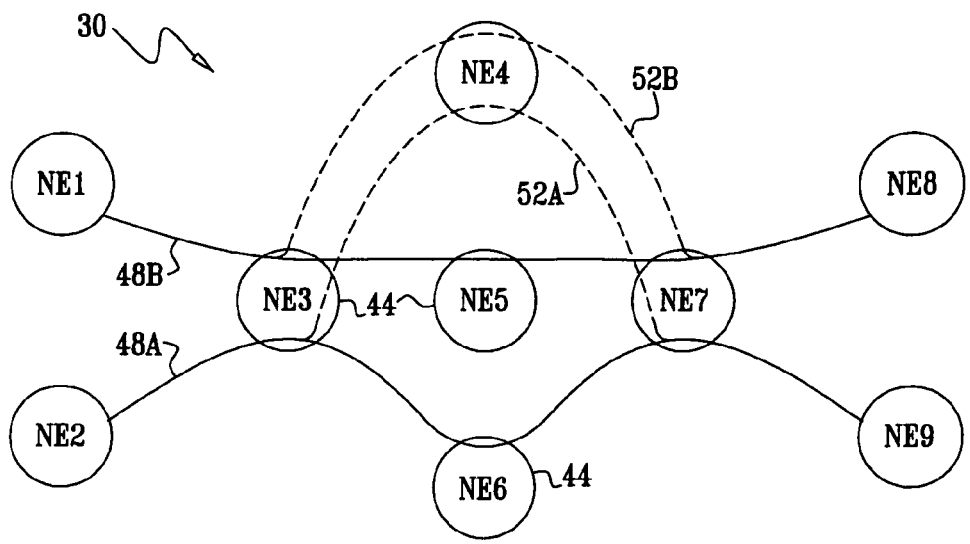
FIG. 2 is a block diagram that schematically illustrates an MPLS communication network, in accordance with another embodiment of the present invention.

To demonstrate the disclosed resource sharing methods, FIGS. 1 and 2 show two exemplary network configurations in which network element resources are shared between MPLS tunnels.

FIG. 1 is a block diagram that schematically illustrates a communication network 20, in accordance with an embodiment of the present invention. An ingress node 24 sends packets to an egress node 28 over an internet protocol (IP) network 32, such as the Internet or other wide-area network (WAN). In the example of FIG. 1, IP network 32 comprises an MPLS network 36, and may comprise network parts outside of network 36 that do not use MPLS. IP network 32 comprises network elements 44, such as routers, switches, concentrators and aggregators. Some of these network elements reside in MPLS network 36 and support MPLS, while others may reside outside of network 36. Network elements 44 communicate with one another using communication links or other shared communication media, referred to herein as network segments 45.

Two communication paths are defined through IP network 32 to form a primary path and an alternative path between nodes 24 and 28. As part of these paths, two MPLS tunnels denoted 40A and 40B are set up through MPLS network 36. As can be seen in the figure, tunnels 40A and 40B traverse two different routes through network 36. Some of network elements 44 and/or segments 45 may be common to the two tunnels. For example, a common network element 46 comprises a network element similar to elements 44, which is traversed by both MPLS tunnels 40A and 40B.

Note that in the present example, tunnels 40A and 40B are separate and independent MPLS tunnels, each being a part of either the primary or the alternative path through IP network 32. In general, tunnels 40A and 40B may begin at the same network element or at different elements. Similarly, the two tunnels may terminate at the same network element or at different elements. Thus, FIG. 1 shows an exemplary network configuration in which two separate MPLS tunnels (as opposed to instances of a single tunnel) traverse one or more common network elements (element 46 in the present example).

As noted above, it is desirable that common network element 46 allocate shared resources to tunnels 40A and 40B. On one hand, at the higher level of the IP network, the two paths between nodes 24 and 28 protect one another, and therefore may share common resource allocations. On the other hand, at the MPLS level, MPLS tunnels 40A and 40B are established independently, therefore MPLS reservation protocols cannot share resource allocations between them.

Using methods which are described in detail below, the network elements are notified of communication paths that may share resources, and consequently allocate shared resources to these paths. Resource sharing increases the available capacity of the network elements and enables them to support a higher number of MPLS tunnels and/or to offer improved QoS. Resource sharing may reduce the physical resources of the network elements (e.g., switching hardware, ports and memory devices) necessary to support a given capacity and/or QoS. Resource sharing may also reduce the bandwidth or other physical resources of shared media, such as the data rate in a ring, for a given capacity and/or QoS.

FIG. 2 is a block diagram that schematically illustrates an exemplary MPLS communication network 30, in accordance with another embodiment of the present invention. Network 30 comprises nine network elements 44 denoted NE1 . . . NE9. Two primary MPLS tunnels 48A and 48B are set up through network 30. Tunnel 48A connects NE2 with NE9 and tunnel 48B connects NE1 with NE8. Primary tunnel 48A is protected by an alternative tunnel 52A against a failure in element NE6. Similarly, an alternative tunnel 52B protects primary tunnel 48B against a failure in element NE5.

It can be seen that network element NE4 is traversed by both alternative tunnels 52A and 52B. In many practical cases, when designing network 30, it is reasonable to design a protection scheme that protects only against a single failure, since the probability of multiple simultaneous failures is typically negligible. Therefore, it is considered reasonable to allow common element NE4 to allocate shared resources to the two alternative tunnels 52A and 52B, assuming NE5 and NE6 are not likely to fail simultaneously.

Again, since tunnels 52A and 52B are independent MPLS tunnels and not instances of the same tunnel, known methods do not enable sharing of the resources of common network element NE4 between them. The methods described below enable such resource sharing to be implemented in network element NE4.

Figure 3:
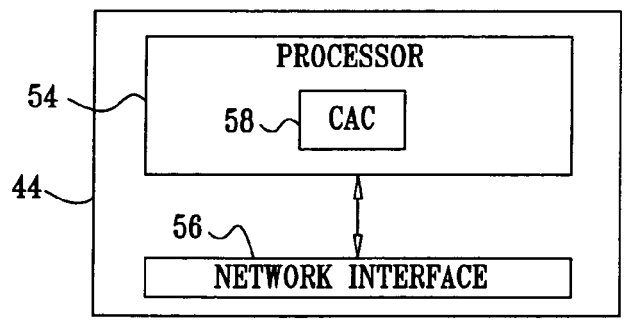
FIG. 3 is a block diagram that schematically illustrates a network element, in accordance with an embodiment of the present invention.

FIG. 3 is a block diagram that schematically illustrates internal blocks of network elements 44 and 46, in accordance with an embodiment of the present invention. For simplicity of explanation, only components that are relevant to the disclosed methods are shown in the figure. As noted above, the network element may comprise a router, a switch, an aggregator, a concentrator or any other element of a communication network. Each network element comprises a processor 54, which performs the different network processing functions defined for the element, and a network interface 56 that communicates with the other network elements in the communication network.

The network element comprises a call admission control (CAC) module 58 that accepts tunnel reservation requests, verifies that sufficient resources are available at the network element, and if available, allocates the resources to the tunnel. As will be shown below, when appropriate, the CAC module allocates shared resources of the network element among two or more MPLS tunnels.

In some embodiments, several network elements 44 (referred to as ring network elements) are arranged in a ring topology, such as using a resilient packet ring (RPR) architecture, as is known in the art. The RPR architecture uses a ring-level CAC module (not shown) that allocates available ring resources, e.g., resources of segments that belong to the ring. The ring-level CAC module typically comprises a software function running in the processor of one of the network elements in the ring. In these embodiments, the ring-level CAC module shares the ring resources among two or more MPLS tunnels.

Typically, processor 54 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, processor 54 may be implemented using a combination of hardware and software elements.

Figure 4:
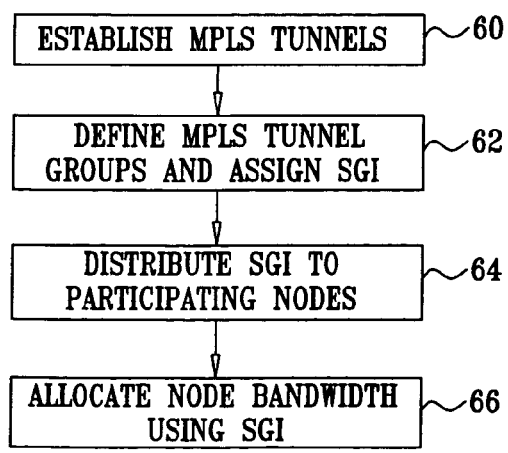
FIG. 4 is a flow chart that schematically illustrates a method for sharing resources in an MPLS communication network, in accordance with an embodiment of the present invention.

FIG. 4 is a flow chart that schematically illustrates a method for sharing network element resources in an MPLS communication network, in accordance with an embodiment of the present invention. The method begins with an operator, such as a network administrator or designer, establishing two or more MPLS tunnels, at a tunnel definition step 60. In some embodiments, the definition of each tunnel comprises specifying suitable bandwidth and/or QoS definitions for the tunnel. In general, each MPLS tunnel traverses the communication network from an ingress node to an egress node and uses resources of a number of network elements 44 and network segments 45 along its route.

Having defined the MPLS tunnels, the operator selects one or more tunnel groups, at a group selection step 62. Each resource-sharing group comprises two or more tunnels that may share resources among them. In other words, each resburce-sharing group is a virtual entity that indicates resource sharing dependence between the group members. The operator may define any number of resource-sharing tunnel groups. For example, a resource-sharing group may comprise a pair of tunnels that are set up to protect one another. The operator assigns each resource-sharing group a unique identifier denoted a "sharing group index" (SGI).

Although the description that follows refers mainly to tunnels that protect one another, the operator may assign tunnels to resource-sharing tunnel groups for other reasons, as well. For example, in some cases the operator may decide to oversubscribe, or overbook, two or more tunnels to a particular resource. For example, the operator may decide to share a 10 Mbps bandwidth allocation on a particular network segment among four 3 Mbps tunnels, assuming that the probability of reaching the maximum potential bandwidth (12 Mbps) is small. In such a scenario, the operation may perform oversubscription by defining the four tunnels as belonging to the same resource-sharing group.

In order to indicate to the network elements which tunnels are affiliated with each resource-sharing group, a notification regarding the affiliation of the MPLS tunnels affiliated with each resource-sharing group index is distributed to network elements 44 in the network, at a distribution step 64. In some embodiments, the network elements are notified of the affiliation by distributing the SGI across the network. In some embodiments, distribution of the SGI is performed as part of the tunnel provisioning process using, for example, the RSVP-TE or CR-LDP reservation protocols cited above. In these embodiments, the SGI of a particular MPLS tunnel is incorporated into the reservation messages sent to the network elements when setting up the tunnel. In some embodiments, the SGI is inserted in a private Type-Length-Value (TLV) field, or object field, in the tunnel set-up messages of the signaling protocol used.

The network elements receive the reservation messages and their CAC modules allocate appropriate resources to the different tunnels, at a resource allocation step 66. Each network element receives the tunnel reservation messages and extracts the SGI values from these messages. If a particular network element, such as common element 46 in FIGS. 1 and 2, is traversed by two or more tunnels affiliated with a certain resource-sharing group, it will receive reservation messages for setting up these tunnels, with the messages having an identical SGI value associated with this resource-sharing group.

The CAC module of the common network element can thus allocate shared resources among the tunnels having identical SGI values. In embodiments in which a ring-level CAC module allocates shared ring resources, the ring-level CAC module shares the resource allocation in the appropriate ring segments among the tunnels of each resource-sharing tunnel group responsively to the received SGI values. In some embodiments, if a certain tunnel reservation message does not contain an SGI value, the CAC module assumes this tunnel is not affiliated with any resource-sharing group and allocates resources to it independently of other tunnels.

Although the methods and systems described herein mainly relate to resource sharing among MPLS tunnels, the principles of the present invention can be used in conjunction with other tunneling protocols, as well as in any other application in which network element and shared media resources may be shared among two or more communication paths.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:

defining a resource-sharing group comprising at least first and second tunnels, which have respective origin network elements and termination network elements and which traverse different routes through a communication network, the routes traversing at least one common network element, wherein the tunnels meet at least one condition selected from a group of conditions consisting of:

the respective origin network elements of the first and second tunnels are different; and the respective termination network elements of the first and second tunnels are different;

distributing a notification over the network of an affiliation of the tunnels with the resource-sharing group; and allocating a resource associated with the at least one common network element so as to share an allocation of the resource among the tunnels in the resource-sharing group responsively to the notification.

2. The method according to claim 1, wherein distributing the notification comprises sending at least one of resource reservation protocol traffic engineering (RSVP-TE) messages and constraint-based label distribution protocol (CR-LDP) messages with respect to the tunnels.

3. The method according to claim 1, wherein defining the resource-sharing group comprises defining a sharing group index (SGI) value associated with the resource-sharing group, wherein distributing the notification comprises sending reservation messages comprising the SGI value so as to set up the tunnels affiliated with the resource-sharing group, and wherein allocating the resource comprises receiving the reservation messages at the common network element and sharing the allocation of the resource responsively to the SGI values in the received reservation messages.

4. The method according to claim 1, wherein one of the tunnels affiliated with the resource-sharing group comprises an alternative tunnel traversing a first route, which is set up to protect a primary tunnel affiliated with the resource-sharing group traversing a second route, different from the first route, against a failure in at least one of a network element and a network segment along the second route.

5. The method according to claim 1, wherein the resource comprises a bandwidth on a common network segment connected to the at least one common network element and traversed by the routes.

6. The method according to claim 5, wherein the common network segment comprises a common ring segment belonging to a ring topology, and wherein allocating the resource comprises allocating the resource of the common ring segment by applying a ring-level call admission control (CAC) function.

7. The method according to claim 1, wherein allocating the resource comprises allocating at least one of a bandwidth, a memory space, a port and a switching hardware component.

8. A network element, comprising:

a network interface for communicating with other elements in a communication network; and a processor, which is arranged to accept, via the network interface, a notification distributed over the communication network of an affiliation with a resource-sharing group of at least first and second tunnels, which have respective origin network elements and termination network elements and which traverse different routes through the network, wherein the tunnels meet at least one condition selected from a group of conditions consisting of:

the respective origin network elements of the first and second tunnels are different; and the respective termination network elements of the first and second tunnels are different, the processor comprising a call admission control (CAC) module, which is arranged, when the network element is traversed by at least some of the tunnels in the resource-sharing group, to allocate a resource associated with the network element so as to share an allocation of the resource among the at least some of the tunnels responsively to the notification.

9. The network element according to claim 8, wherein the notification comprises at least one of resource reservation protocol traffic engineering (RSVP-TE) messages and constraint-based label distribution protocol (CR-LDP) messages with respect to the tunnels.

10. The network element according to claim 8, wherein the processor is arranged to receive reservation messages comprising a sharing group index (SGI) value associated with the resource-sharing group, and wherein the CAC module is arranged to share the allocation of the resource responsively to the SGI values in the received reservation messages.

11. The network element according to claim 8, wherein the resource-sharing group comprises an alternative tunnel traversing a first route, which is operative to protect a primary tunnel traversing a second route, different from the first route, against a failure in at least one of a network element and a network segment along the second route.

12. The network element according to claim 8, wherein the resource comprises a bandwidth on a common network segment connected to the network element and traversed by the routes.

13. The network element according to claim 12, wherein the common network segment comprises a common ring segment belonging to a ring topology, and comprising a ring-level call admission control (CAC) module, which is arranged to share the allocation of a resource of the common ring segment.

14. The network element according to claim 8, wherein the CAC module is arranged to allocate at least one of a bandwidth, a memory space, a port and a switching hardware component.

15. A computer software product used in a network element, the product comprising a computer-readable medium, in which program instructions are stored, which instructions, when read by a computer, cause the computer to accept a notification, distributed over a communication network, of an affiliation with a resource-sharing group of at least first and second tunnels, which have respective origin network elements and termination network elements and which traverse different routes through the network, and to allocate a resource associated with the network element so as to share, when the network element is traversed by at least some of the tunnels in the resource-sharing group, an allocation of the resource among the at least some of the tunnels responsively to the notification, wherein the tunnels meet at least one condition selected from a group of conditions consisting of:

the respective origin network elements of the first and second tunnels are different; and the respective termination network elements of the first and second tunnels are different.

16. The product according to claim 15, wherein the notification comprises at least one of resource reservation protocol traffic engineering (RSVP-TE) messages and constraint-based label distribution protocol (CR-LDP) messages with respect to the tunnels.

17. The product according to claim 15, wherein the instructions cause the computer to receive reservation messages comprising a sharing group index (SGI) value associated with the resource-sharing group and to share the allocation of the resource responsively to the SGI values in the received reservation messages.

18. The product according to claim 15, wherein the resource-sharing group comprises an alternative tunnel traversing a first route, which is operative to protect a primary tunnel traversing a second route, different from the first route, against a failure in at least one of a network element and a network segment along the second route.

19. The product according to claim 15, wherein the resource comprises a bandwidth on a common network segment connected to the at least one common network element and traversed by the routes.

20. The product according to claim 19, wherein the common network segment comprises a common ring segment belonging to a ring topology, and wherein the instructions cause the computer to apply a ring-level call admission control (CAC) function so as to share the allocation of the resource in the common ring segment.

21. The product according to claim 15, wherein the instructions cause the computer to allocate at least one of a bandwidth, a memory space, a port and a switching hardware component.

22. A communication network, comprising a plurality of interconnected network elements, which are arranged to accept a notification distributed over the communication network of an affiliation with a resource-sharing group of at least first and second tunnels, which have respective origin network elements and termination network elements and which traverse different routes through the network, wherein the tunnels meet at least one condition selected from a group of conditions consisting of:
   the respective origin network elements of the first and second tunnels are different; and
   the respective termination network elements of the first and second tunnels are different,
   wherein each network element among the plurality is arranged so that when the network element is traversed by at least some of the tunnels in the resource-sharing group, the network element allocates a resource associated with the network element so as to share an allocation of the resource among the at least some of the tunnels responsively to the notification.

* * * * *